United States Patent [19]

Fortmann et al.

[11] Patent Number: 4,835,368

[45] Date of Patent: May 30, 1989

[54] FOOD TREATMENT CABINET WITH FLASH STEAMER

[75] Inventors: Robert C. Fortmann, Mundelein; Curtis C. Pinnow, Libertyville, both of Ill.

[73] Assignee: Carter-Hoffmann Corporation, Mundelein, Ill.

[21] Appl. No.: 126,248

[22] Filed: Nov. 27, 1987

[51] Int. Cl.[4] .............................................. F24C 7/00
[52] U.S. Cl. .................................... 219/401; 219/273; 126/369; 126/20
[58] Field of Search ............... 219/272, 273, 275, 401; 126/20, 20.2, 20.1, 369, 369.1, 369.3

[56] References Cited

U.S. PATENT DOCUMENTS

| | | | |
|---|---|---|---|
| 2,674,935 | 4/1954 | Lewis | 219/401 |
| 3,077,530 | 2/1963 | Chase | 219/401 |
| 3,744,474 | 7/1973 | Shaw | 219/401 |
| 4,722,268 | 2/1988 | Rightley | 219/401 |

*Primary Examiner*—Teresa J. Walberg
*Attorney, Agent, or Firm*—Wood, Dalton, Phillips, Mason & Rowe

[57] ABSTRACT

A food treatment/holding apparatus has a cabinet defining a storage space for food to be treated, a heater with a surface that can be heated above the boiling temperature of water, and structure for delivering a metered amount of water at preselected intervals against the heater surface to produce water vapor in the food storage space.

15 Claims, 2 Drawing Sheets

FOOD TREATMENT CABINET WITH FLASH STEAMER

BACKGROUND OF THE INVENTION

1. Field of the Invention

This invention relates to cabinets for treating food items and, more particularly, to a cabinet with a food storage space in which both temperature and humidity can be selectively controlled.

2. Background Art

It is the principal objective of restaurateurs and fast food operators to provide to their customers food items that have a fresh-cooked taste. In high volume establishments cooking on a per order basis is impossible. Instead, food items are generally precooked and placed in a heated food treatment cabinet.

Designers of food treatment cabinets strive to maintain, as long as possible, the temperature, appearance, taste, texture, and aroma of precooked food items. This objective often competes with the need to eliminate foodborne bacteria. If the cooking space in the cabinet is maintained at temperatures in excess of 140° F., most of the bacteria is killed, however, at these elevated temperatures the foods may be further cooked, which is undesirable, and/or may dry out. The result is that generally restaurateurs and fast food operators permit only a very limited storage time for precooked items, after which the items are disposed of. Profits in such operations are thus increased by lengthening permissible storage time for food in the treatment cabinet.

One attempt to preserve the just-cooked taste of foods has been to humidify the food storage space within the cabinet. Generally, a pan of water is provided in the bottom of the food storage space and heated above the boiling point of the water so that there is a progressive buildup of humidity within the storage space. While the infusion of steam in food treatment cabinets has resulted in a considerable improvement over dry cabinets, the uncontrolled humidity tends to continuously cook the food items, and may also cause saturation of the food items with water so that they are not of the same quality as they were upon being introduced to the cabinet.

SUMMARY OF THE INVENTION

The present invention is specifically directed to overcoming the above enumerated problems in a novel and simple manner.

According to the invention, a food treatment/holding apparatus is provided having a cabinet defining a storage space for food to be treated, a heater with a surface that can be heated above the boiling temperature of water, and structure for delivering a metered amount of water at preselected intervals against the heater surface to produce water vapor in the food storage space.

With the above structure, the food items are exposed to humid air so that the appearance, taste, texture and aroma of food are maintained. However, vapor is not continuously produced, as in the aforementioned prior art structures, so that the problem of saturation of food items is obviated.

Preferably, water is pulsed against the heater surface at timed intervals. Control structure is provided to control the interval time between pulses. A high humidity setting may produce a 3 second interval while a low humidity setting may produce a 60 second interval. One can thus select the desired amount of humidity within the cabinet, which may vary from food to food. A versatile cabinet results.

Preferably, the cabinet has an access opening with a hinged door that is selectively closed and opened by the operator. With the door opened, there is a loss of water vapor to the atmosphere. Another aspect of the invention is the provision of a structure to reset the control upon the door being opened. This immediately causes a pulse of water to be delivered to the heater surface and will normally compensate for the humidity lost to the atmosphere.

In a preferred form, the heater surface is disposed at the bottom of a reservoir in a bottom wall of the cabinet. The temperature of the heater surface is controlled so that the pulsed water is flashed to steam immediately upon encountering the heater surface.

A first thermostat is provided to prevent delivery of water to the heater surface until the heater surface has achieved the minimum temperature necessary to permit flash steaming. A second thermostat is provided to control the temperature of the heater at a level just slightly higher than the minimum necessary for flash steaming. This will improve the cabinet's temperature performance and minimize the heat rise due to the flash steam heater.

The heater may take a number of forms. For example, cast heaters, tubular heater elements and silicon pad heaters may be used.

DETAILED DESCRIPTION OF THE DRAWINGS

Figure 2:
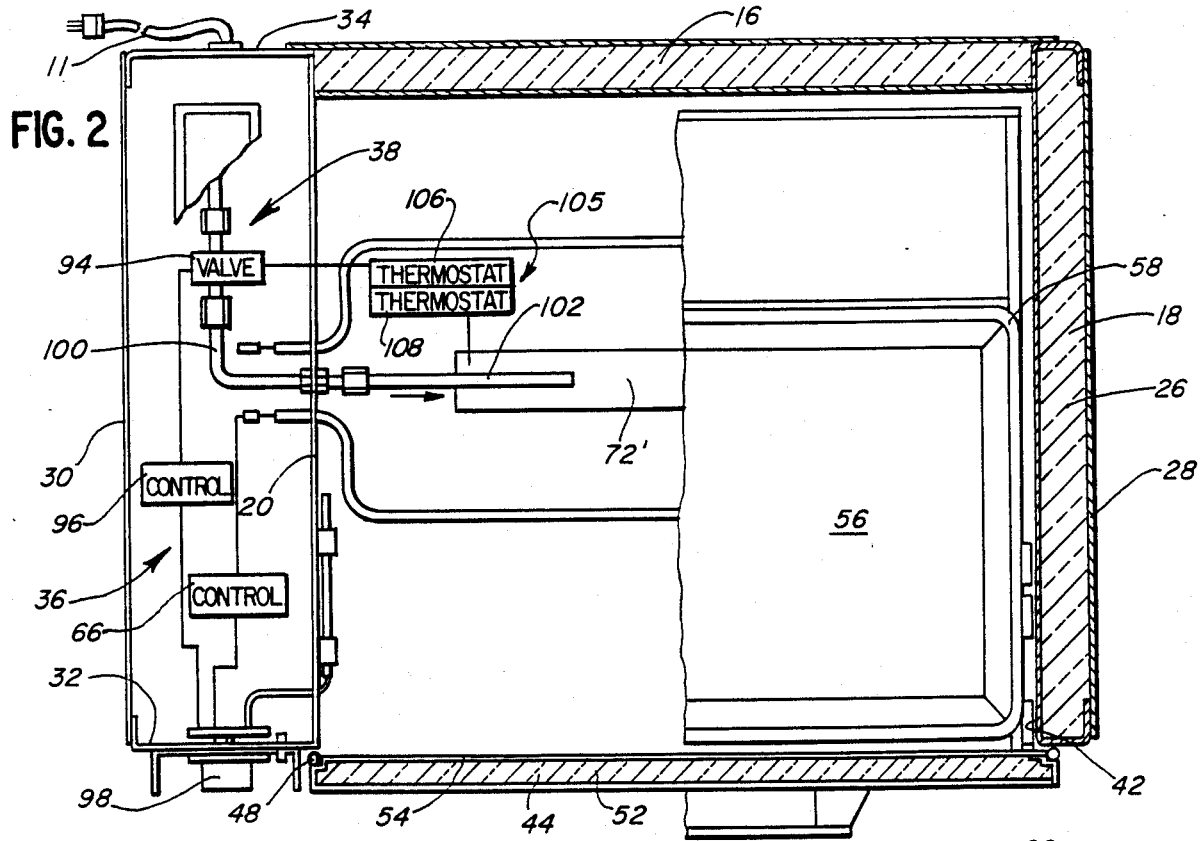
FIG. 2 is a section view of the treating/holding apparatus taken along line 2—2 of FIG. 1.
Figure 1:
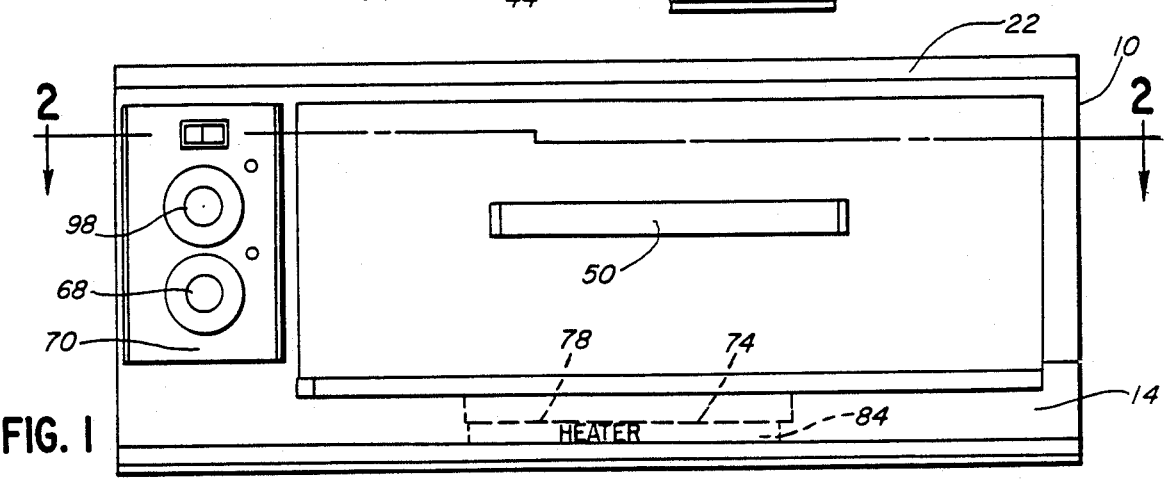
FIG. 1 is a front elevation view of a treating/holding apparatus according to the present invention.

A food treating/holding apparatus according to the present invention is shown in FIGS. 1-5. The food treating/holding apparatus consists of a generally squared cabinet 10, supplied with electrical power through a cord 11, and defining an internal space 12 for the storage of food to be treated. The food treatment space 12 is bounded by front wall 14, rear wall 16, side walls 18, 20, top wall 22 and bottom wall 24. With the exception of side wall 20, each wall 14, 16, 18, 22, 24 has a core 26, which may be insulating fiberglass batt, encased by a stainless steel sheet material 28. The wall 20, in conjunction with the side wall 30, front wall 32, rear wall 34 and top and bottom walls 22, 24 respectively, bounds an air filled space 36 within which controls and other mechanisms at 38, for operation of the food treating/holding apparatus, are provided. The air space 36 acts as a barrier to limit heat transfer from the food treatment space through side wall 20 to the atmosphere.

The front wall 14 has a generally rectangular opening 42 through which access can be gained to the food treatment space 12. A door 44, matched to the configuration of opening 42, is hingedly attached at its lower edge 46 to the front wall 14 for pivoting movement between a closed position, shown in FIGS. 1, 2 and in solid lines in FIG. 3, and an open position, shown in phantom in FIG. 3. In the closed position, a silicon or like seal 48 is captured between the door 44 and front wall 14 of the cabinet 10 to minimize heat and humidity loss from the space 12. Manipulation of the door 44 between its open and closed position is facilitated by the provision of a handle 50 on the front of the door 44. The door 44 is likewise shown to consist of an insulated core 52 encased by a stainless steel sheet material 54. A laterally extending trough 55 collects condensed vapor that drips down the door 44 and/or front wall 14.

Figure 3:
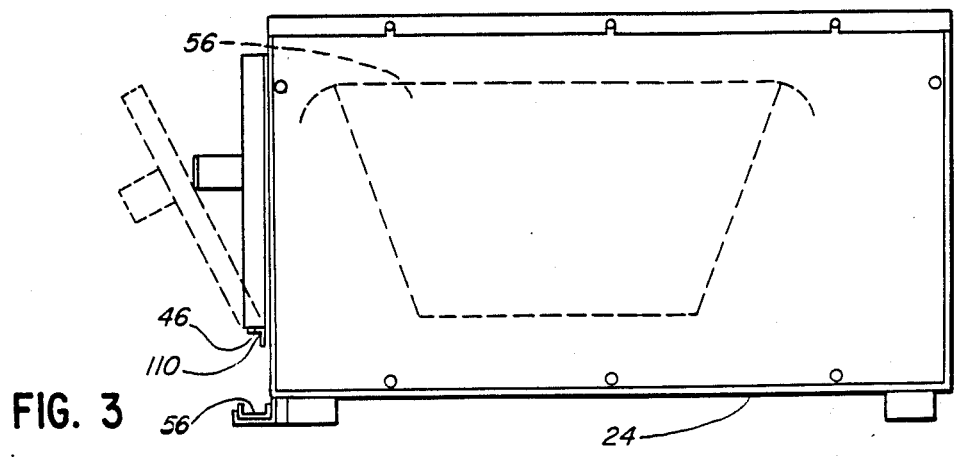
FIG. 3 is a side elevation view of the treating/holding apparatus.
Figure 4:
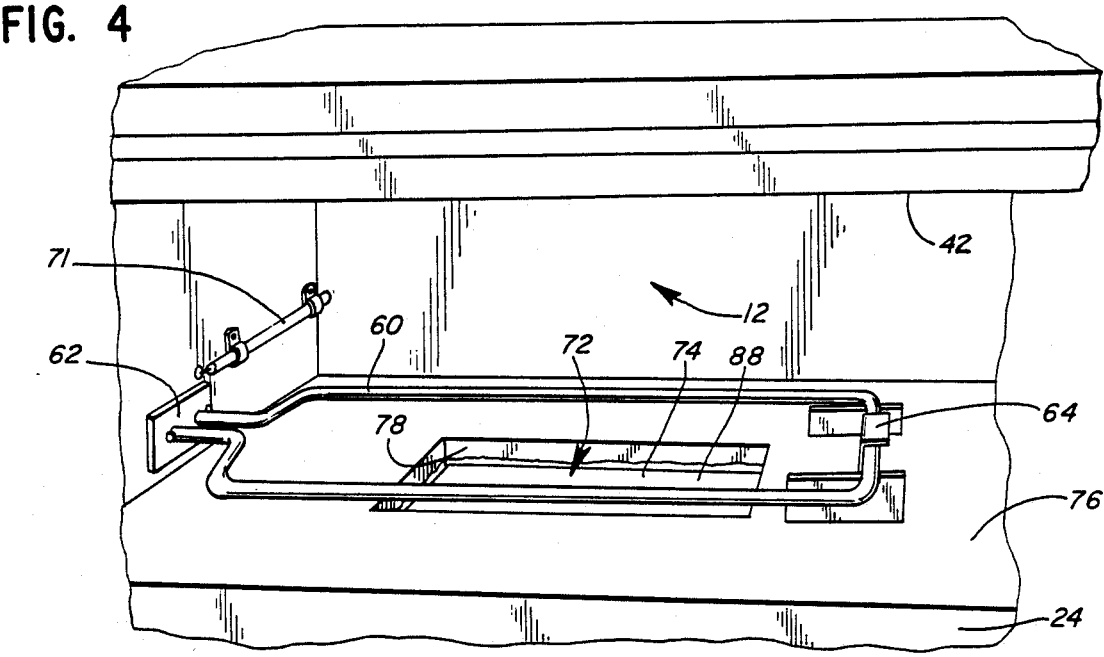
FIG. 4 is an enlarged, fragmentary, perspective view of a food storage space within the food treating/holding apparatus and showing a heater for air within the space and structure according to the invention for controllably developing humidity within the space.

In FIGS. 2 and 3 a pan 56 is shown mounted within the food storage space 12. The pan 56 has an upwardly opening, cup-shaped configuration to retain a supply of food to be treated within the space 12. The pan 56 has a peripheral rim 58 which can be used to conventionally support the pan so that it is elevated from the bottom wall 24 of the cabinet 10. The pan 56 is preferably perforate to permit passage of steam therethrough and into the food items retained thereby.

The space 12 is heated by a conventional tubular heater element 60 supported above the bottom cabinet wall 24 cooperatively by a plate 62 on the cabinet side wall 20 and a bracket 64 carried on the cabinet bottom wall 24. The amount of heat developed by the element 60 can be selected through a conventional control 66 operable through a knob 68 on a control console 70 exposed at the front of the cabinet 10. A temperature probe 71 senses the temperature in the space 12 and feeds back a signal to a conventional control 66 so that the preset temperature will be maintained in the space 12.

Humidity is developed within the cabinet 10 at reservoir 72, 72' defined in the bottom wall 24 of the cabinet 10. Each of the reservoirs 72, 72' has a generally rectangular configuration, with the reservoir 72 being slightly wider than the reservoir 72', which modification is principally a design consideration. The reservoirs 72, 72' are otherwise the same and thus discussion herein will be limited to reservoir 72.

Figure 5:
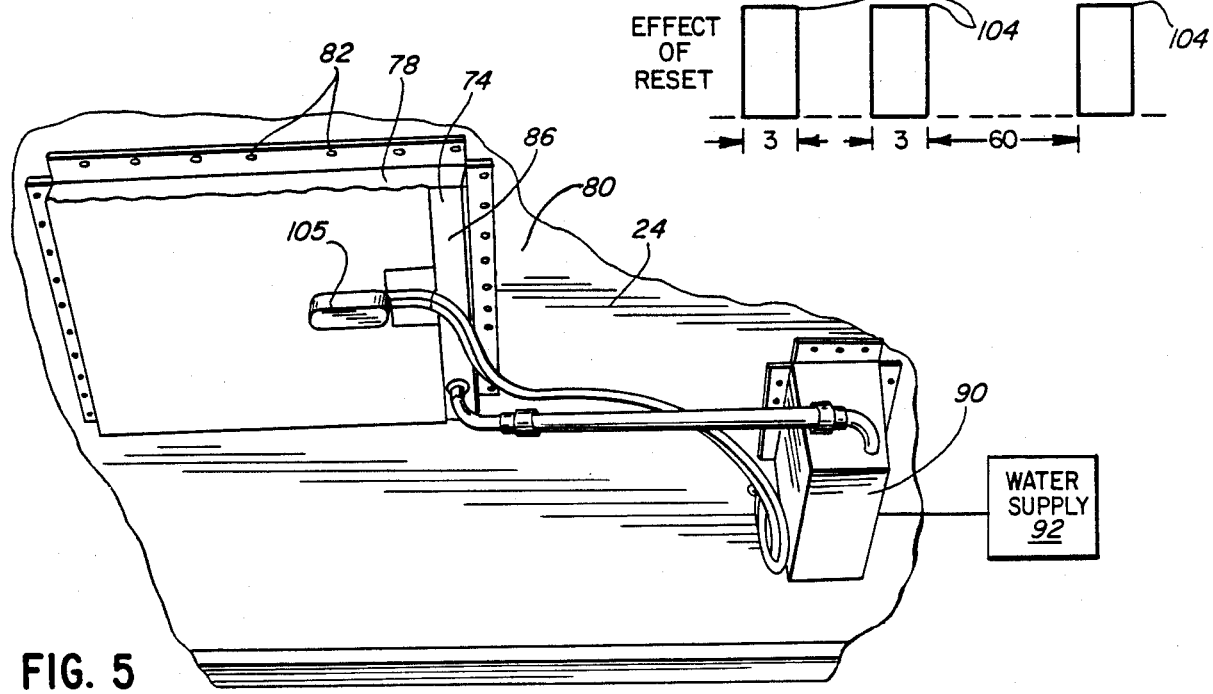
FIG. 5 is an enlarged, underside perspective view of humidity developing structure on the food treating/holding apparatus.

The reservoir 72 has a bottom wall 74 recessed below the upwardly facing surface 76 of the bottom wall 24 of the cabinet 10. A peripheral wall 78 extends upwardly from the bottom wall 74 of the reservoir 72. In FIG. 5, the bottom wall 74 and associated peripheral wall 78 on the reservoir 72 are formed as a unit which is attached to the underside 80 of cabinet wall 24 as by rivets or spot welds 82.

A cast heater 84, of conventional construction, is fixed to the underside 86 of the reservoir bottom wall 74 in heat exchange relationship therewith. The cast heater 84 shown is only exemplary of a number of heaters that can be used. For example, a silicon pad heater or tubular heater element as used in ovens can be substituted. The type of heater chosen must have a capacity to heat the upwardly facing surface 88 on the bottom wall 74 of the reservoir to the boiling temperature of water. Once the upwardly facing surface 88 of the bottom reservoir wall 74 is suitably heated, water from a reservoir 90, secured to the underside 80 of the bottom cabinet wall 24, is delivered controllably against the surface 88 and is immediately flashed to steam, which diffuses throughout the space 12. Water is supplied to the reservoir from a conventional, pressurized supply 92.

According to the invention, the water is intermittently released for delivery against the reservoir surface 88 by a solenoid water valve 94. The solenoid valve 94 is operated by an adjustable control 96 which is manually set by the operator through a knob 98 at the front of the cabinet 10. The control 96 causes the valve 94 to be operated to release pulses of water from the reservoir 90 through a tube 100 having an outlet end 102 situated over the reservoir surface 88.

Figure 6:
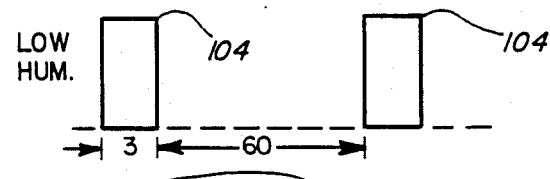
FIG. 6 is a graphic representation of different humidity settings within the cooking space.

The operation of the valve 94 is shown graphically in FIG. 6. The control 96 operates to release water in three second pulses 104. The precise length of the pulse is generally a design consideration. By setting the knob 98, the user can adjust the control 96 to change the interval between successive pulses. In the low humidity setting shown in FIG. 6, pulses are set at approximately 60 second intervals. The high humidity setting shows pulse intervals of three seconds. Both the high humidity and low humidity pulse patterns are repetitive.

If the temperature of the reservoir wall 88 is below the boiling temperature of water, the incoming water will flood the reservoir 72. This increases the time it takes to elevate the temperature of the reservoir surface 88 to the boiling point of water and additionally eliminates any control that the user has over the humidity, which will be continuously developed in the reservoir 72 until the majority of the water evaporates. If the surface 88 is above a predetermined temperature, the water tends to spatter and as a result, is not thoroughly vaporized. To prevent either of these conditions from occurring, a control 105 with first and second thermostats 106, 108 is provided. Each of the thermostats 106, 108 detects, through a conventional probe, the temperature of the reservoir surface 88. Upon the first thermostat control 106 detecting a temperature insufficient to flash water to steam, the solenoid valve 94 is controlled to prevent release of water thereby to the reservoir 72, 72'. The second thermostat control prevents operation of the valve 94 upon detecting a temperature of the reservoir surface above a predetermined temperature.

Another aspect of the invention is the provision of an interval reset switch 110 which is operable upon the door being moved from its closed to its open position. Once the door is open, the control 96 is reset so that a pulse 104 of water is released and the following pulse 104 will occur at the interval selected by the user through the control knob 68. This is shown graphically in FIG. 6 wherein the control 96 is shown set for a 60 second interval. The middle pulse is caused by the door being opened. The preceding pulse occurred less than 60 seconds therebefore. The normal 60 second interval is thereafter repeated unless the door is opened at which time reset again occurs. This feature replenishes the vapor within the space 12 that may have been lost to the atmosphere upon the door being opened.

It can be seen that the heat and humidity within the cabinets can be positively controlled by the user so that foods within the space 12 can be effectively preserved in a "just-cooked" state.

We claim:
1. A food treating/holding apparatus comprising:
 a cabinet defining a storage space for food to be treated;

a heater having a surface that can be heated to a sufficiently high temperature to vaporize water in said storage space; and means for intermittently delivering a metered amount of water at controlled intervals against the heater surface to produce water vapor in said food storage space, wherein said cabinet has an access opening to permit placement of food items in and removal of food items from said storage space and a door mounted for selective movement between a closed position wherein the access opening is covered and an open position, and means are provided for causing said means for delivering water to deliver a metered quantity of water to the heater surface as an incident of said door being moved from its closed position to its open position and back to its closed position to produce humidity in the food storage space that compensates for humidity loss to the atmosphere upon said door being opened.

2. The food treating/holding apparatus according to claim 1 wherein said cabinet has a bottom wall, there is a reservoir on said bottom cabinet wall and the heater surface is within said reservoir.

3. The food treating/holding apparatus according to claim 1 including thermostat means to prevent delivery of water against the heater surface by said water delivery means with said heater surface below a preselected temperature.

4. The food treating/holding apparatus according to claim 1 including thermostat means to prevent delivery of water against the heater surface by said water delivering means with said heater surface above a predetermined temperature.

5. The food treating/holding apparatus according to claim 1 wherein a heater element is provided to heat air in the food storage space.

6. The food treating/holding according to claim 1 wherein means are provided to preset a constant time interval between successive deliveries of metered amounts of water by said water delivering means to thereby control the amount of humidity within the food storage space.

7. A food treating/holding apparatus comprising:
a cabinet defining a storage space for food to be treated;
a heater having a surface that can be heated sufficiently to vaporize water; and
means for intermittently delivering a metered amount of water at controlled intervals against the heater surface to produce water vapor in said food storage space,
wherein said cabinet has an access opening to permit placement of food items in and removal of food items from said storage space and a door mounted for selective movement between a closed position wherein the access opening is covered and an open position, and means are provided to cause said means for delivering water to deliver a metered quantity of water to said storage space upon said door being moved from its closed position to its open position to produce humidity in the food storage space that compensates for humidity loss to the atmosphere upon said door being opened.

8. A food treating/holding apparatus comprising:
a cabinet defining a storage space for food to be treated and an access opening through which access can be gained to said food treatment space;
a door;
means for mounting the door to the cabinet for movement between a closed position wherein the door covers the cabinet access opening and an open position;
a heating surface within said food treatment space;
means for heating the heating surface to a temperature sufficiently high to vaporize water; and
means for delivering water against the heating surface in pulses of preselected duration with a preselected length interval between successive pulses to produce water vapor in the food storage space.

9. The food treating/holding apparatus according to claim 8 wherein said cabinet has a bottom wall and there is a reservoir in the cabinet bottom wall bounded by an upwardly facing wall that is recessed below the bottom cabinet wall.

10. The food holding apparatus according to claim 9 wherein said heating means is a cast heater and means mount the cast heater in heat exchange relationship with said upwardly facing wall.

11. The food treating/holding apparatus according to claim 8 including thermostat means to prevent delivery of water against the heating surface by said water delivering means with said heater surface below a preselected temperature.

12. The food treating/holding apparatus according to claim 8 including thermostat to prevent delivery of water against the heating surface by said water delivering means with said heater surface above a preselected temperature.

13. The food treating/holding apparatus according to claim 8 wherein a heater element is provided to heat air in the food storage space.

14. The food treating/holding apparatus according to claim 8 wherein said delivering means includes means for varying the preselected interval between successive pulses.

15. A food treating/holding apparatus comprising:
a cabinet defining a storage space for food to be treated and an access opening through which access can be gained to said storage space;
a door;
means for mounting the door to the cabinet for movement between a closed position wherein the door covers the cabinet access opening and an open position;
a heater having a surface that can be heated above the boiling temperature of water; and
means for delivering water against the heater surface in pulses of preselected duration with a predetermined length interval between successive pulses to produce water vapor in the food storage space.
wherein means are provided to cause delivery of a pulse of water and reset the means for delivering water as an incident of said door being moved from its closed position to its open position to thereby produce humidity in the food storage space that compensates for humidity loss to the atmosphere upon said door being opened.

* * * * *